US011741959B2

(12) United States Patent
Aggarwal et al.

(10) Patent No.: US 11,741,959 B2
(45) Date of Patent: Aug. 29, 2023

(54) ISOLATING A DEVICE, FROM MULTIPLE DEVICES IN AN ENVIRONMENT, FOR BEING RESPONSIVE TO SPOKEN ASSISTANT INVOCATION(S)

(71) Applicant: Google LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 147 days.

(21) Appl. No.: 17/476,774

(22) Filed: Sep. 16, 2021

(65) Prior Publication Data
US 2022/0005475 A1    Jan. 6, 2022

Related U.S. Application Data

(63) Continuation of application No. 16/324,286, filed as application No. PCT/US2017/065359 on Dec. 8, 2017, now Pat. No. 11,138,972.

(51) Int. Cl.
*G10L 15/22*        (2006.01)
*G06F 3/14*         (2006.01)
(Continued)

(52) U.S. Cl.
CPC ............ *G10L 15/22* (2013.01); *G06F 3/1423* (2013.01); *G10L 15/26* (2013.01); *G10L 15/30* (2013.01);
(Continued)

(58) Field of Classification Search
CPC ......... G10L 15/22; G10L 15/26; G10L 15/30; G10L 2015/223; G06F 3/1423;
(Continued)

(56) References Cited

U.S. PATENT DOCUMENTS

| 7,904,297 B2 * | 3/2011 | Mirkovic | ................ G06F 40/40 704/235 |
| 8,340,975 B1 * | 12/2012 | Rosenberger | ........... G10L 15/22 704/274 |

(Continued)

FOREIGN PATENT DOCUMENTS

CN           105027194          11/2015

OTHER PUBLICATIONS

European Patent Office; Communication pursuant to Article 94(3) issued in Application No. 20161249.6, 8 pages, dated Apr. 13, 2022.

(Continued)

*Primary Examiner* — Michael Colucci
(74) *Attorney, Agent, or Firm* — Gray Ice Higdon

(57) ABSTRACT

Methods, apparatus, systems, and computer-readable media are provided for isolating at least one device, from multiple devices in an environment, for being responsive to assistant invocations (e.g., spoken assistant invocations). A process for isolating a device can be initialized in response to a single instance of a spoken utterance, of a user, that is detected by multiple devices. One or more of the multiple devices can be caused to query the user regarding identifying a device to be isolated for receiving subsequent commands. The user can identify the device to be isolated by, for example, describing a unique identifier for the device. Unique identifiers can be generated by each device of the multiple devices and/or by a remote server device. The unique identifiers can be presented graphically and/or audibly to the user, and user interface input. Any device that is not identified can become temporarily unresponsive to certain commands, such as spoken invocation commands.

15 Claims, 5 Drawing Sheets

(51) Int. Cl.
  *G10L 15/30* (2013.01)
  *H04W 4/02* (2018.01)
  *G10L 15/26* (2006.01)
  *H04L 67/75* (2022.01)
  *H04L 67/01* (2022.01)

(52) U.S. Cl.
  CPC ............ *H04L 67/75* (2022.05); *H04W 4/027* (2013.01); *G10L 2015/223* (2013.01); *H04L 67/01* (2022.05)

(58) Field of Classification Search
  CPC ......... G06F 3/167; H04L 67/75; H04L 67/01; H04W 4/027
  See application file for complete search history.

(56) References Cited

U.S. PATENT DOCUMENTS

| | | | |
|---|---|---|---|
| 9,424,841 B2 | 8/2016 | Foerster et al. | |
| 11,138,972 B2 | 10/2021 | Aggarwal et al. | |
| 2002/0072905 A1* | 6/2002 | White | G10L 15/30 704/E15.047 |
| 2002/0193991 A1* | 12/2002 | Bennett | G10L 15/32 704/E15.049 |
| 2011/0014952 A1 | 1/2011 | Minton | |
| 2011/0214162 A1 | 9/2011 | Brakensiek et al. | |
| 2012/0265528 A1* | 10/2012 | Gruber | G10L 15/183 704/235 |
| 2013/0183944 A1* | 7/2013 | Mozer | H04L 12/2818 455/414.1 |
| 2014/0088961 A1* | 3/2014 | Woodward | G10L 15/22 704/235 |
| 2014/0218517 A1* | 8/2014 | Kim | H04L 12/2836 348/143 |
| 2014/0278435 A1* | 9/2014 | Ganong, III | G10L 15/22 704/275 |
| 2015/0006184 A1 | 1/2015 | Marti et al. | |
| 2015/0198938 A1* | 7/2015 | Steele | B25J 9/1689 700/275 |
| 2016/0146866 A1* | 5/2016 | Houlette | G01R 21/133 702/62 |
| 2016/0148099 A1* | 5/2016 | Micali | G06N 20/00 706/11 |
| 2016/0217790 A1* | 7/2016 | Sharifi | G10L 15/285 |
| 2016/0260431 A1 | 9/2016 | Newendorp et al. | |
| 2017/0076720 A1 | 3/2017 | Gopalan et al. | |
| 2017/0090864 A1* | 3/2017 | Jorgovanovic | H04M 11/007 |
| 2017/0206779 A1* | 7/2017 | Lee | G08C 17/02 |
| 2017/0347317 A1* | 11/2017 | Fontaine | H04W 52/0261 |
| 2018/0158460 A1* | 6/2018 | Lee | G10L 15/22 |
| 2019/0394383 A1* | 12/2019 | Kim | H04N 23/56 |

OTHER PUBLICATIONS

Chinese Patent Office; First Office Action issued in application No. 201780092034; 37 pages; dated Nov. 2, 2022.
European Patent Office; Communication issue in Application Ser. No. 20161249.6; 5 pages; dated Sep. 17, 2020.
European Patent Office; Intention to Grant, Application No. 17828807.2, 7 pages, dated Oct. 16, 2019.
European Patent Office—International Searching Authority; Notification of Transmittal of the International Search Report and the Written Opinion of PCT Serial No. PCT/US2017/065359; dated Aug. 22, 2018.
Chinese Patent Office; Notice of Grant issued in application No. 201780092034.X; 4 pages; dated Mar. 20, 2023.

* cited by examiner

ISOLATING A DEVICE, FROM MULTIPLE DEVICES IN AN ENVIRONMENT, FOR BEING RESPONSIVE TO SPOKEN ASSISTANT INVOCATION(S)

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Such interface inputs invoke the automated assistant and, since they are provided at the client device, explicitly indicate a desire of the user to interact with the automated assistant via the client device. However, many automated assistants can also be invoked in response to one or more spoken invocations, which are also known as "hot words/phrases" or "trigger words/phrases". For example, a spoken invocation such as "Hey, Assistant," can be spoken to a variety of different devices in order to invoke an automated assistant. This allows for uniformity of operation, without requiring a user to learn multiple spoken invocations for their different devices.

Often, a client device that includes an assistant interface includes one or more locally stored models that the client device utilizes to monitor for an occurrence of a spoken invocation phrase. Such a client device can locally process received audio data utilizing the locally stored model, and discard any audio data that does not include the spoken invocation phrase. However, when local processing of received audio data indicates an occurrence of a spoken invocation phrase, the client device will then cause following audio input to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase), no response from the automated assistant will be provided as a result of "what time is it" not being preceded by an invocation phrase.

Many client devices offer an assistant interface for interfacing with a corresponding automated assistant. For example, mobile phones, stand-alone speaker devices, tablets, in-vehicle computing devices, and/or other client devices can each be utilized by a user to interact with an automated assistant. While offering users the ability to interface with an automated assistant via any of a plurality of disparate client devices can be advantageous, it is often the case that multiple client devices in an environment of a user will at least initially invoke an automated assistant in response to a spoken utterance that includes an invocation phrase. For example, if a user is in an environment with four client devices that each include an assistant interface that is "triggered" by "Hey, Assistant", a spoken utterance of "Hey, Assistant, what time is it" can cause all four devices to transmit data packets including audio data corresponding to at least "what time is it" to one or more remote server devices associated with an automated assistant. While some techniques have been proposed for determining which of the four client devices will respond when the four client devices are all associated with the same user account, it is still the case that all four client devices will transmit audio data in response to the spoken utterance. This causes a waste of network resources (by transmitting four separate instances of the same audio data) and can cause a waste of computational resources (e.g., as a result of remote servers processing all four separate instances of audio data). Moreover, where the four client devices are not associated with the same account, it may be the case that multiple client devices will respond to the spoken utterance. In addition to providing a poor user experience, this also wastes client device resources and networking charges for mobile client devices on a metered network, as a single response from a single client device would have sufficed. For example, if four individuals are in a vehicle and all have a personal client device that is responsive to "Hey, Assistant", the spoken utterance of "Hey, Assistant, what time is it" can cause all four devices to provide an audible response of the current time.

SUMMARY

Implementations set forth herein relate to isolating at least one device, from multiple devices in an environment, for being responsive to assistant invocations (e.g., spoken assistant invocations). Some of those implementations utilize one or more user interface inputs of a user to determine which client device(s) (e.g., a single client device) should be responsive to one or more spoken invocations of an automated assistant and/or to determine which client device(s) should at least temporarily limit their responsiveness to one or more of the spoken invocations.

As one example, assume a user is in an environment (e.g., a vehicle) with three client devices that each include an assistant interface that is "triggered" by "Hey, Assistant". Implementations described herein can be utilized to cause only one of those three devices to be responsive to subsequent spoken invocations of "Hey, Assistant"—while causing the other two of those three device to temporarily limit their responsiveness to "Hey, Assistant". For instance, the other two devices can temporarily limit their responsiveness by completely "turning off" their microphones, by suspending monitoring for occurrences of the spoken invocation phrase (e.g., suspending any local processing of received audio data utilizing a locally stored model to recognize an invocation phrase), and/or by suspending transmission of audio data to remote automated assistant server(s).

Accordingly, when the responsiveness of the other two devices is limited, the isolated device will be the only one of the three devices that performs one or more functions in response to various spoken utterances. For example, the isolated device can be the only one of the three devices that: actively monitors for an occurrence of the spoken invocation phrase, transmits audio data to remote automated assistant server(s) (e.g., based on a detection of an instance of the spoken invocation phrase), and/or that renders (e.g., audibly and/or graphically) automated assistant output for presentation to the user. In these and other manners, network resources, resources of client device(s), and/or resources of server device(s) are conserved. For example, network resources and/or resources of server device(s) can be conserved as a result of only the isolated device transmitting data packets for processing by the server device(s) when the responsiveness of the other two devices is limited. Also, for example, resources of the non-isolated client devices can be conserved as a result of not performing, when their responsiveness is limited, certain local processing of spoken utterances, not transmitting data packets in response to certain spoken utterances, and/or not receiving and/or rendering any automated assistant output.

In some implementations, one or more server devices are utilized in isolating at least one device, from multiple devices in an environment, for being responsive to assistant invocations. In those implementations, the one or more server devices can receive data packets from multiple client devices in multiple environments. For example, the one or more server devices can receive data packets transmitted by automated assistant client applications of the multiple client devices, process those data packets, and take one or more responsive action(s) based on the processing. For instance, a data packet from a client device can include audio data, the processing can include voice-to-text conversion of the audio data and/or semantic analysis of the audio data, and the one or more responsive actions can include one or more automated assistant actions that are determined based on the voice-to-text conversion and/or semantic analysis. The automated assistant actions can include, for example, generating an appropriate automated assistant response and transmitting the response to the client device for presentation at the client device; interfacing with a third-party agent to cause the third-part agent to transmit responsive content for presentation at the client device; interfacing with a third-party agent to cause the third-part agent to respond with responsive content, and transmitting the responsive content to the client device; providing commands to one or more internet-of-things (IoT) devices to cause the IoT device(s) to alter their state; etc. In other words, the one or more server devices can be one or more clusters of high performance computers running software suitable for handling high volumes of automated assistant requests originating from corresponding automated assistant applications of a large quantity of client devices, and optionally for processing and responding to those automated assistant requests.

In some implementations, the one or more server devices can analyze incoming data packets to identify a group of the data packets that includes data packets that are from multiple devices in a given environment, and that each indicate receipt of a single spoken utterance of a user. The server device(s) can analyze incoming data packets to identify a group of data packets that are all associated with the same/similar time stamp, and that all indicate receipt of a single spoken utterance. For example, the group of data packets can be identified based on client-side and/or server-side assigned time stamps of the data packets all being within a threshold (e.g., 500 milliseconds or other threshold) of one another, and based on each of the data packets indicating a spoken invocation phrase (e.g., "Hey, Assistant") and/or indicating a spoken utterance that explicitly indicates a desire for a device isolation process (e.g., "set up my devices", "isolate a device", and/or other phrase(s)). In some implementations, the client devices perform speech-to-text and/or other conversions of audio received at the client devices, and the indication of the single spoken utterance in the data packets transmitted by the client devices can include text of the single spoken utterance and/or another client-device generated representation of the spoken utterance. In some additional or alternative implementations, the client devices transmit data packets that include audio data (e.g., streaming audio) and the server device(s) process the audio data of the data packets to determine the data packets each indicate receipt of a single spoken utterance. For example, the server device(s) can make such a determination based on the same text being indicated by voice-to-text processing of the audio data of the data packets, based on similarity in audio characteristics in the audio data of the data packets (e.g., similarities in volume, tone, intonation, and/or other characteristic(s)), etc. The server device(s) can additionally and/or alternatively identify the group of data packets based on other features of the data packets, such as: rough geographic location data included in the data packets (to ensure the data packets of the group originated from client devices in the same rough geographic location); a Wi-Fi SSID identified included in the data packets (to ensure the data packets of the group originated from client devices utilizing the same network), user identifier(s) included in the data packets (e.g., when the device isolation process is performed for client devices all associated with the same user identifier), etc.

Accordingly, the server device(s) are able to employ one or more techniques to identify, from a large stream of incoming data packets, a group of the data packets that all indicate receipt of a single spoken utterance. The server device(s) can further select a subset of client devices based on the data packets of the group being received from the client devices of the subset. Accordingly, the server device(s) are able to determine a subset of client devices that are likely all located in the same environment, based on analysis of a large stream of incoming data packets that include data packets from the client devices of the subset, as well as data packets from disparately located client devices. As understood from the above description, this can be achieved even when one or more of the client devices of the subset are associated with user identifier(s) that are different from user identifier(s) of other client device(s) of the subset. For example, various implementations analyze the incoming data packets based on time stamps, audio data, geographic location, and/or other features that are "user identifier agnostic", to determine a group of data packets that indicates a desire or need for a device isolation process.

The server device(s) can transmit one or more commands to at least one of the client devices of the subset to cause the at least one of the client devices to provide user interface output related to a device isolation process. As one nonlimiting example, the server device(s) can transmit a corresponding unique identifier to each of the client devices to cause each of the client device(s) to audibly and/or graphically render its unique identifier. For instance, a unique identifier can include a color and/or shape, and one of the client devices can graphically render the color and/or the shape on its display. The user interface output can additionally and/or alternatively include output from one or more of the client devices that prompts the user to select one of the client devices and/or otherwise guides the user in selecting one of the client devices.

User interface input received in response to providing the user interface output can then be utilized to identify a single client device, from the subset of the client devices, for isolation. For example, the user interface input can be a further spoken utterance that identifies the unique color and/or shape displayed by a single one of the client devices, and the further spoken utterance can be analyzed to determine that the single one of the client devices is the one to be isolated and/or to determine that the other client device(s) are not to be isolated. The analysis of the further spoken utterance can occur at one or more of the client device(s) (e.g., using local voice-to-text and/or semantic processing) and/or at the server device(s) (e.g., based on further data packets transmitted by the client devices that are based on the further spoken utterance).

Additional and/or alternative techniques can be utilized to determine that a single one of the client devices is the one to be isolated and/or to determine that other client device(s) are not to be isolated. For example, a user can interface with a touch screen and/or other user interface input device (e.g., a hardware button) of a client device to indicate that the client device should be isolated (or should not be isolated). For instance, the client devices can each be display-less devices, the provided user interface output related to the device isolation process can be audible output of "tap the device you wish to isolate", and a client device can be isolated based on detecting a "tap" at a hardware element of the client device (an optionally other client devices can be non-isolated based on not detecting any tap within a threshold time duration). As another example, a spoken utterance can mention a device name, a device type, a device manufacturer, a device model, and/or other feature of a client device, and such spoken utterance analyzed and compared to known features of the client devices of the subset, to determine which client device is isolated by the spoken utterance. For instance, assume a first client device that is a smartphone having an assigned name of "Scott's phone" and being manufactured by "Company A", and a second client device that is a tablet having an assigned name of "John's" and being manufactured by "Company B". Any one of the spoken utterances of "the phone", "the Company B device", "John's device", or "the tablet" could be analyzed and compared to the known properties to determine which of the two client devices is being referenced by the spoken utterance.

The automated assistant client of the isolated device can remain in a state in which it continues to be responsive to spoken invocation phrase(s) and/or other spoken utterances. The automated assistant clients and/or other properties of the non-isolated devices can then be altered to cause the non-isolated devices to be unresponsive to spoken invocation phrases and/or other spoken utterances. For instance, microphones of the non-isolated devices can be completely disabled, the non-isolated devices can suspend monitoring for occurrences of spoken invocation phrase(s), and/or can suspend transmission of detected audio data to remote server device(s). The non-isolated devices can stay in such altered state for a time duration (e.g., 20 minutes, 30 minutes, and/or other fixed duration or dynamically determined duration) and/or until particular user interface input is receive. For example, a user can interface with virtual elements via a touch screen of a non-isolated client device to cause the non-isolated client device to again start being responsive to spoken invocation phrase(s) and/or other spoken utterances. A non-isolated device can optionally be altered in response to a commands from a server device(s) (e.g., when the server device(s) determine which device is isolated and/or which device(s) are not isolated), or in response to the non-isolated device itself determining it is not selected for isolation (e.g., based on determining that received user interface input does not indicate the non-isolated device).

Although a particular technique for isolating at least one device, using one or more server devices, is described above, alternative techniques can be provided. Such alternative techniques can be performed independent of server device(s), and/or utilizing server device(s) in a different manner. As one example, each of multiple client devices in an environment can recognize, locally at the client device, user interface input that causes the client device to transition into a device isolation mode. For instance, each client device can locally process audio data to determine, based on the processing, when a spoken utterance (e.g., "set up my device", "isolate a device", and/or "perform isolation process") is detected that explicitly indicates a desire for device isolation. In some implementations, each client device can be configurable to understand and respond in different languages. However, a client device that is setup to be responsive to a first language (e.g., French) can still be responsive to spoken utterances provided in a second language (e.g., English) when the client device is in an environment with other client devices receiving the spoken utterances. This allows for automated assistants to provide their full functionality in regions where multiple languages are spoken in close proximity.

Each client device, in response to recognizing the user interface input, can transition into a device isolation mode by audibly and/or graphically rendering a unique identifier such as a randomly (truly random or pseudo-random) determined color, shape, and/or alpha and/or numeric code. Further, each client device can monitor detected spoken input received after the rendering to determine if the further spoken input matches (soft or exact) the rendered unique identifier. If a client device determines the spoken input matches its rendered unique identifier, it can remain responsive to spoken invocation phrase(s) and/or other spoken utterances—otherwise, it can transition to a state in which it limits (partially or fully) its responsiveness to spoken invocation phrase(s) and/or other spoken utterances. For example, assume each unique identifier is a corresponding random numeric code. A client device can monitor for a further spoken utterance that matches its random numeric code in determining whether to remain responsive, or transition to a limited responsiveness state. As a variation of the preceding example, one or more (e.g., all) of the client devices can, instead of processing audio data and/or making determinations locally, transmit detected audio data to one or more server devices, and receive processed audio data and/or commands in response that can then be utilized in transitioning into a device isolation process, in determining whether a spoken utterance corresponds to a displayed unique identifier, etc.

The above description is provided as an overview of some implementations of the present disclosure. Further description of those implementations, and other implementations, are described in more detail below.

In some implementations, a method implemented by one or more processors is set forth as including operations such as receiving data packets at one or more server devices. The data packets can be received at the one or more server devices in response to transmission of the data packets by client devices in multiple environments. The operations can also include identifying a group of the data packets. Identifying the group of the data packets can include identifying the group of the data packets based on: time stamps of the data packets of the group, and the data packets of the group each indicating receipt of a single spoken utterance of a user. The operations can also include selecting a subset of two or more of the client devices based on the data packets of the group of the data packets being received from the client devices of the subset. The subset of the client devices can each be located in an environment of the multiple environments. The operations can further include, in response to selecting the subset of the client devices: transmitting one or more commands to at least one of the client devices of the subset to cause the at least one of the client devices to provide user interface output related to a device isolation process; based on user interface input received in response to providing the user interface output, identifying a single client device, from the subset of the client devices, for isolation; and based on identifying the single client device for isolation: causing automated assistant clients of each of the client devices of the subset that are in addition to the single client device to be unresponsive to one or more spoken invocation phrases.

The single spoken utterance of the user can be a device isolation utterance that explicitly indicates a desire for the device isolation process, and identifying the data packets based on the data packets of the group each indicating receipt of the single spoken utterance can be based on the single spoken utterance explicitly indicating the desire for the device isolation process. The data packets of the group can each comprise audio data that captures at least part of the single spoken utterance, and identifying the data packets based on the data packets of the group each indicating receipt of the single spoken utterance can include processing the audio data of each of the data packets of the group to determine that the data packets of the group each capture at least part of the single spoken utterance. Processing the audio data of each of the data packets of the group to determine that the data packets of the group each include at least part of the single spoken utterance can include performing one or both of: a voice-to-text conversion of the audio data of each of the data packets of the group; and performing a voice characteristics analysis of the audio data of each of the data packets of the group. Performing the voice characteristics analysis of the audio data can include performing a fast Fourier transform (FFT) decomposition of the audio data to generate audio spectra data, and comparing the audio spectra data to voice characteristics data. The time stamps can be based on one or more times of receipt of the data packets at one or more of the server devices or one or more times of transmission of one or more data packets by the client devices of the subset. The single spoken utterance of the user can be one of the one or more spoken invocation phrases. Identifying the group of the data packets can be further based on: global positioning system (GPS) data, geographic data identified by the data packets of the group, a Wi-Fi SSID identified by the data packets of the group, or velocity data identified by the data packets of the groups or by GPS data. The user interface output related to the device isolation process can include a unique identifier for each of the client devices of the group. The user interface output can include display of a corresponding one of the unique identifiers at each of the client devices of the group.

In other implementations, a method implemented by one or more processors is set forth as including operations such as receiving an instance of a spoken utterance at a first client device that is operating in an environment with one or more additional client devices that also received the instance of the spoken utterance. Each of the first client device and the one or more additional client devices can include an assistant application that is responsive to the spoken utterance. The operations can also include providing, by the first client device and based on receiving the instance of the spoken utterance at the first client device, user interface output that can provide a prompt, to a user, related to whether the first client device is to be responsive to invocations of the assistant application. The operations can further include determining, based on a response of the user to the prompt, that the first client device is not to be responsive to invocations of the assistant application. The operations can also include, in response to determining that the first client device is not to be responsive to invocations of the assistant application: causing the assistant application of the first client device to temporarily limit responsiveness to one or more spoken invocations of the assistant application.

Causing the assistant application of the first client device to temporarily limit responsiveness to the one or more spoken invocations of the assistant application can include: temporarily disabling, at the first client device, monitoring for occurrence of the one or more spoken invocations. The operations can also include determining a delay time; and monitoring, by the first client device during the delay time, for any response to the instance of the spoken utterance, from any one of the one or more additional client devices. Providing the user interface output by the first client device can be after the delay time, and can be in response to not detecting any response during the monitoring. Determining that the first client device is not to be responsive to invocations of the assistant application can include determining that the response lacks any identifier of the first client device. The instance of the spoken utterance can be an explicit request to prevent responsiveness of one or more client devices to the invocations of the assistant application. The operations can also include causing, based on receiving the instance of the spoken utterance at a second client device, the second client device to provide an identifier from which the user can identify the second client device in the response.

In yet other implementations, a method implemented by one or more processors is set forth as including operations such as determining that a single instance of a spoken utterance of a user was received by each of a plurality of client devices in an environment. The operations can also include, based on determining that the single instance of the spoken utterance was received by each of the plurality of client devices in the environment: causing each of the plurality of client devices in the environment to provide corresponding user interface output that uniquely identifies a corresponding one of the client devices relative to other of the plurality of client devices. The operations can further include receiving a further spoken utterance from the user after causing the plurality of client devices in the environment to provide the corresponding user interface outputs. The operations can also include isolating a single client device from the plurality of client devices. Isolating the single client device can be based on the further spoken utterance indicating the corresponding user interface output provided by the single client device; and in response to isolating the single client device: maintaining the single client device as responsive to one or more spoken assistant application invocations, and transitioning each of the plurality of client devices, that are in addition to the single client device, to a state in which they are unresponsive to the one or more spoken assistant application invocations.

In some implementations, causing each of the plurality of client devices in the environment to provide corresponding user interface output that uniquely identifies a corresponding one of the client devices relative to other of the plurality of client devices can include causing the plurality of the client devices to simultaneously display the corresponding user interface outputs. The corresponding user interface outputs can include different colors, with each of the different colors corresponding to a corresponding one of the plurality of client devices. Causing each of the plurality of client devices in the environment to provide corresponding user interface output that uniquely identifies a corresponding one of the client devices relative to other of the plurality of client devices can include causing the plurality of client devices to audibly present the user interface output at separate time intervals.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
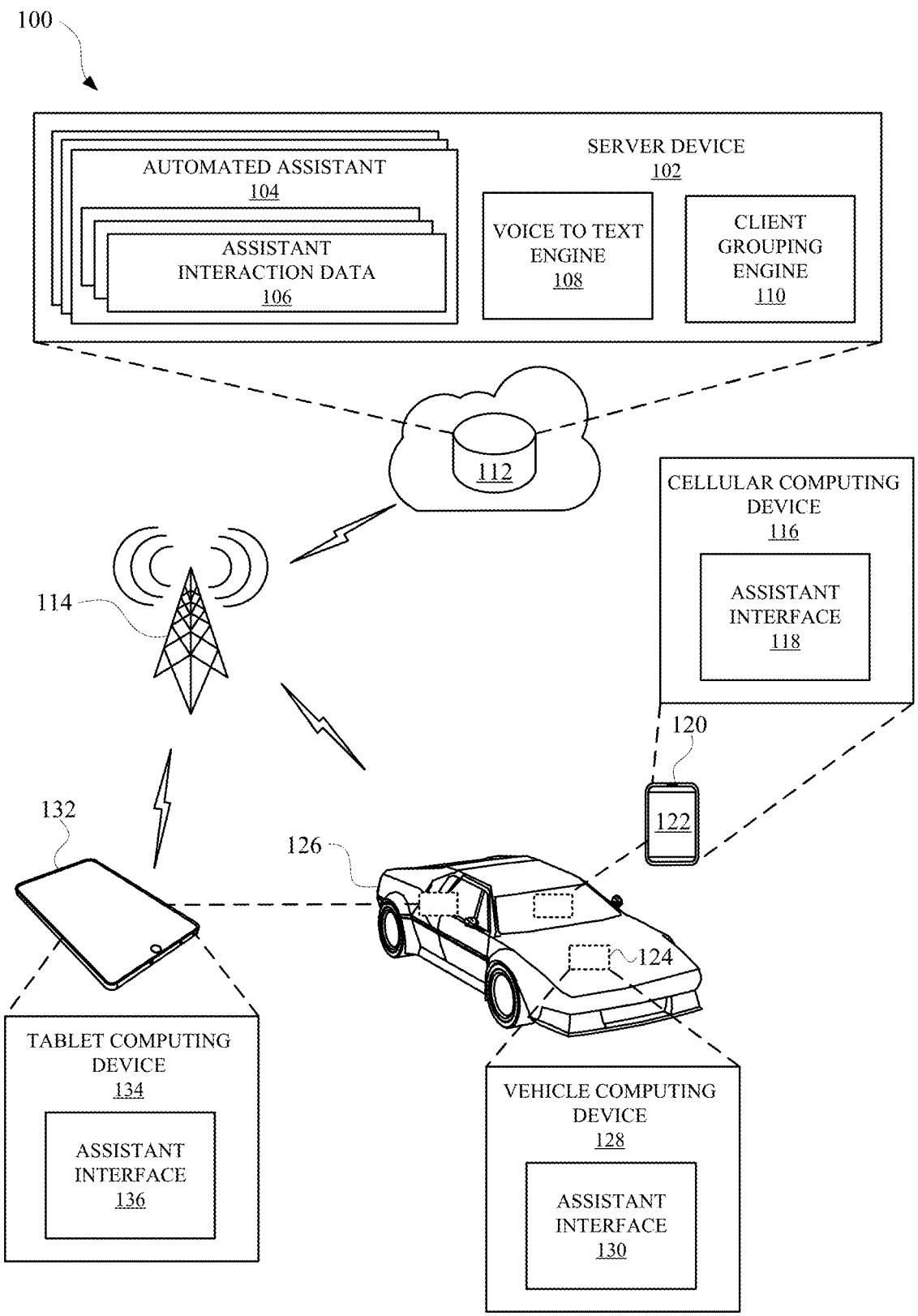
FIG. 1 illustrates a system for isolating a client device from multiple client devices to receive commands and/or subsequent dialog.

Typically, in an environment where a user is proximate to multiple devices, such as a car where multiple devices are present (e.g., a vehicle client device and multiple smart phone client devices), the user may provide a spoken utterance that incidentally invokes multiple devices in the environment. This can be frustrating for the user and/or other people in the vicinity, as their respective devices may simultaneously respond to the spoken utterance, wasting power and computational resources of the devices. In order to ensure that a desired device is isolated for receiving spoken utterances, a user can request that the devices change their settings such that a single device is responsive to certain spoken utterances, and other devices are not.

In some implementations, a remote server device can assist with coordinating the device(s) such that a single primary device will exclusively be responsive to certain spoken utterances, at least for a finite duration of time. For instance, the remote server device can receive data packets indicating that multiple users are simultaneously providing spoken utterances to their respective devices. The remote server device can specifically identify the data packets corresponding to requests for isolating a client device from other client devices for being responsive to spoken utterances. For example, multiple users can provide a spoken utterance such as, "Setup my devices," which can be embodied as audio data in data packets provided to the remote server device. The remote server device can also identify groups of devices that have similar contexts in which the spoken utterance is being provided. For example, the remote server device can determine a relative location, velocity, route, time stamps (e.g., a time of receipt of a spoken utterance), network name, voice signature, proximity to one or more networks or locations, and/or any other features from which a context of a spoken utterance can be gleaned using contextual data provided in data packets. In some implementations, data packets used to determine a context of a spoken utterance can also be used to generate a hash for identifying a token from which a personal identifier (e.g., an account name or email address name) can be determined. The personal identifier can then be used to specifically identify the client devices that received the spoken utterance.

The remote server device can compile one or more personal identifiers into a group or a subset that is associated with the context. For instance, when the user is driving in a vehicle with multiple client devices, a group of client devices corresponding to a single personal identifier can be identified at least based on a location of the group of client devices, a time that the spoken utterance was received at the group of client devices, and/or a velocity at which the vehicle is traveling (e.g., as determined by the remote server device). The remote server device can then generate a unique identifier for each client device in the group of client devices. A unique identifier can be provided as a visual output (e.g., a display graphic), an audible output (e.g., a name output by a client device), and/or any other unique identifier that can be used to identify a device.

In some implementations, the remote server device can either cause all of the client devices or some of the client devices in the group of client devices to present their respective identifier to the user. For example, the remote server device can designate a primary client device of the group of client devices to audibly provide a query to the user regarding selecting one of the client devices to be responsive to subsequent spoken utterances and invocation phrases. The primary client device can then transmit the selection back to the remote server device in order that the remote server device can modify the settings of each client device of the group of client devices accordingly. Alternatively, each of the client devices in the group of client devices can listen for the selection from the user and adjust their individual settings accordingly. For instance, if the user selects the primary client device, the other client devices can acknowledge that they were not selected and adjust their settings to temporarily not be responsive to subsequent spoken utterances and invocation phrases.

In other implementations, a process of isolating a client device of a group or a subset of client devices can be performed without necessarily communicating with a remote server device. For example, a user can provide a spoken utterance (i.e., a device isolation utterance) to a group of client devices in their apartment in order to isolate a primary client device for being responsive to spoken utterances. Initially, each client device can receive the spoken utterance and generate a random listening time period in which each client device will listen for a response from another client device. The client device that generated the shortest listening time period can be the first to provide a response to the user, and the other client devices can listen for the first response. In some implementations, each of client devices can generate unique images (e.g., grocery store items such as coffee or produce) or graphics (e.g., random colors) for presenting to the user, in order that the user can identify one of the client devices from the images. When the other client devices acknowledge the first response or present their unique image, the other client devices can listen for the user to identify a primary client device. If the user provides a response identifying a primary client device (e.g., "Isolate my tablet computer" or "Isolate the device showing green"), the other client devices not identified in the response from the user can adjust their settings to be temporarily unresponsive to certain spoken utterances and invocation phrases.

In some implementations, a user can isolate a group of devices, which can include third party devices and/or applications. For example, a user can have a variety of devices that include an assistant application and a third party assistant application. The third party assistant application can be associated with an application programming interface (API) that allows the assistant application to interact with the third party assistant application. In this way, the assistant application can be arranged to temporarily limit a responsiveness of third party assistant applications at the direction of the user, without the user having to directly engage with the third party assistant application.

Turning now to the Figures, FIG. 1 illustrates a system 100 for isolating a client device from multiple client devices to receive commands and/or subsequent dialog. The system 100 can include a remote device 112, such as a server device 102, which can host an automated assistant 104. In some implementations, the automated assistant 104 can be hosted at the server device 102, and/or one or more computing devices capable of hosting an assistant application. For example, in some implementations, the automated assistant 104 can be hosted at a cellular computing device 116, a vehicle computing device 128 of a vehicle 126, and/or a personal computing device 132 such as a tablet computing device 134. Processes and/or functions performed by the automated assistant 104 can be performed by the server device 102, or distributed over separate devices. For instance, a user can provide an input, such as a voice command or a textual input, at an assistant interface 118 of the cellular computing device 116. The input from the user can be transmitted from the cellular computing device 116, over a network 114, such as a private network (e.g., peer-to-peer), or a public network (e.g., the internet), to the server device 102. When the input is a voice command, or other audible input from the user, the input can be received at a voice to text engine 108, which can be part of the automated assistant 104 or separate from the automated assistant 104.

The voice to text engine 108 can convert the input into text, which can be parsed by the automated assistant 104 to determine how the automated assistant 104 can sufficiently respond to the input from the user.

Interactions between one or more users and the automated assistant 104 can be stored as assistant interaction data 106. The assistant interaction data 106 can, for example, provide correspondence data that identifies one or more inputs received from the one or more users and one or more responses generated from the automated assistant 104. The automated assistant 104 can employ one or more machine learning algorithms for learning or otherwise adapting to user requests, preferences, and/or how the user otherwise interacts with the automated assistant 104. In some implementations, the server device 102 and/or the automated assistant 104 can include a client grouping engine 110. The client grouping engine 110 can be an application, script, and/or other executable data capable of processing data packets from one or more devices (e.g., devices 116, 134, and/or 128, other server devices) and generating a list of devices that are providing similar requests. Such requests can include a request from a user to isolate a particular device from multiple devices for receiving subsequent commands and/or dialog.

As an example, a user can be navigating their vehicle 126 along a highway and inside of the vehicle 126 can be multiple different devices. The multiple different devices can include one or more that are owned by, or otherwise associated with, the user—and/or one or more that are each owned by, or otherwise associated with, another corresponding user (e.g., an occupant of the vehicle). The devices can include an integral device such as a vehicle computing device 128, a portable computing device 120 such as a cellular computing device 116, and a personal computing device 132 such as a tablet computing device 134. While in transit, the user can provide a spoken utterance to an assistant interface 136 of the tablet computing device 134. The spoken utterance can include dialog such as, "Assistant, please setup my devices." The spoken utterance can correspond to a function that is executable by the automated assistant 104 for isolating one device of multiple devices to receive commands and dialog, thereby causing the other devices to be temporarily unresponsive to particular commands and dialog.

In response to receiving the spoken utterance, the tablet computing device 134 can communicate with the server device 102 regarding the spoken utterance. Furthermore, because the server device 102 can be in communication with other client devices associated with other users, the server device 102 can employ a client grouping engine 110 to correlate particular requests. Specifically, the client grouping engine 110 can identify client devices that are receiving similar spoken utterances within a particular time period. From the group of client devices that are receiving similar spoken utterances, the client grouping engine 110 can optionally further group client devices according to contexts in which the spoken utterances were provided. For example, the client grouping engine 110 can identify a group of client devices because they received similar spoken utterances within a particular time period and are located in similar locations. Contextual data, such as vehicle speed, route information, destination, origin, times stamps, network name, and/or any other data can also be used to identify a group of client devices. Such contextual data can be processed to generate a hash or other data that can be used to identify a token from which to identify a single instance of a spoken utterance. For instance, the spoken utterance provided by the user can be received nearly concurrently by the tablet computing device 134, the vehicle computing device 128, and the cellular computing device 116. The server device 102 can determine that the spoken utterance corresponds to the single instance of the spoken utterance based on voice data (e.g. a voice signature, tone, pitch), contextual data (e.g., location, vehicle speed), device identifiers, and/or any other data from which a single instance of a spoken utterance can be identified.

When a group of client devices has been identified by the server device 102, the automated assistant 104 can acknowledge the group of client devices and designate at least one client device of the group of client devices as a primary client device. The primary client device can be designated for querying the user regarding which client device they would like to isolate from the other client devices in the group for receiving commands and dialog. The primary client device can be identified by the server device 102 based on, for example, the assistant interaction data 106, which can identify the device most recently used by the user to perform a particular function (e.g., place a phone call, send a message, search the internet, access media, etc.). Additionally or alternatively, the primary client device can be identified by the server device 102 based on a property of the client device, such as how engaged a user would have to be with the client device to respond to the query given the environment they are interacting (e.g., driving a vehicle). For instance, the automated assistant 104 can determine a level of engagement for each client device and select the vehicle computing device 128 as the primary client device. As yet another example, the automated assistant 104 can randomly or pseudo-randomly select the primary client device.

The automated assistant 104 can cause the selected primary client device (e.g., the vehicle computing device 128) to provide a query to the user regarding selecting a client device to be isolated from the other client devices. Specifically, the query can be provided at an assistant interface 130, such as a speaker system, and include dialog such as, "Please identify the device you would like to remain interactive." In response, the user can identify a particular device by its apparent feature(s) or name, such as "my tablet computer," "my cell phone," or "the vehicle computer." However, in some implementations the server device 102 can cause the primary client device and/or the other client devices in the group of client devices to provide a unique identifier. For instance, the server device 102 and/or the automated assistant 104 can identify the group of client devices, determine that each of the client devices include display devices, and generate unique graphics to be displayed at each display device. The server device 102 and/or the automated assistant 104 can then cause each client device of the group of client devices to display a unique graphic from which the user can identify a client device. For instance, each user interface of each client device can be caused to display different colored shapes (e.g., a green circle, a blue circle, a red circle, etc.).

In some implementations, the server device 102 and/or the automated assistant 104 can identify the group of client devices and determine that one or more of the client devices do not include a display device and/or include an audio interface. The server device 102 and/or the automated assistant 104 can then generate unique device names, which can be audibly presented through an audio interface (e.g., a speaker) of each device. For example, the unique device names can be "first device," "second device," and "third device." In some implementations, each client device can audibly provide the unique device name that has been assigned to the client device. Alternatively, the unique device names can be "tablet device," "vehicle device," and "cell device." Furthermore, the primary client device can be caused to recite each of the unique device names (e.g., "Ok, would you like the 'tablet device,' the 'vehicle device,' or the 'cell device,' to remain interactive?"). In some implementations, the unique device name of a client device can be based on a name previously assigned to the client device (e.g., in a device set up process), a manufacturer of the client device, a model of the client device, and/or other feature(s) of the client device.

The user can respond to the primary client device by reciting the unique name and/or describing the graphic that is displayed (e.g., "The device with the circle.") at a user interface. The primary client device can then transmit a data packet corresponding to the selection to the server device 102. The server device 102 can thereafter cause the client devices of the group of client devices that are not identified by the selection (e.g., the green circle) to be temporarily unresponsive to spoken utterances, dialog, spoken invocation phrases, and/or any other inputs that can be provided from the user. In some implementations, the unselected client devices can be temporarily unresponsive until the contextual data provided by one or more of the client devices to the server device 102 indicate a change in context (e.g., the user is no longer driving, in a different location, has participated in a calendar event that is over, etc.). In some implementations, a user can transition an unresponsive client device out of an unresponsive state via certain user interface input, such as interaction with a hardware button of the client device, interaction with a touchscreen of the client device (e.g., to select a particular virtual element), etc.

In some implementations, when the primary client device provides the query regarding the client device that will be isolated, the other non-primary client devices can listen for a response from the user. Further, and optionally, each client device can be aware of their unique name and the unique name of the other client devices. Each client device can listen for a response from the user, and if the user does not identify a respective client device, the respective client device can become temporarily unresponsive without necessarily communicating the selection to the server device 102. Furthermore, the client device that is selected can remain interactive until the user otherwise modifies a setting of the selected client device.

Figure 2:
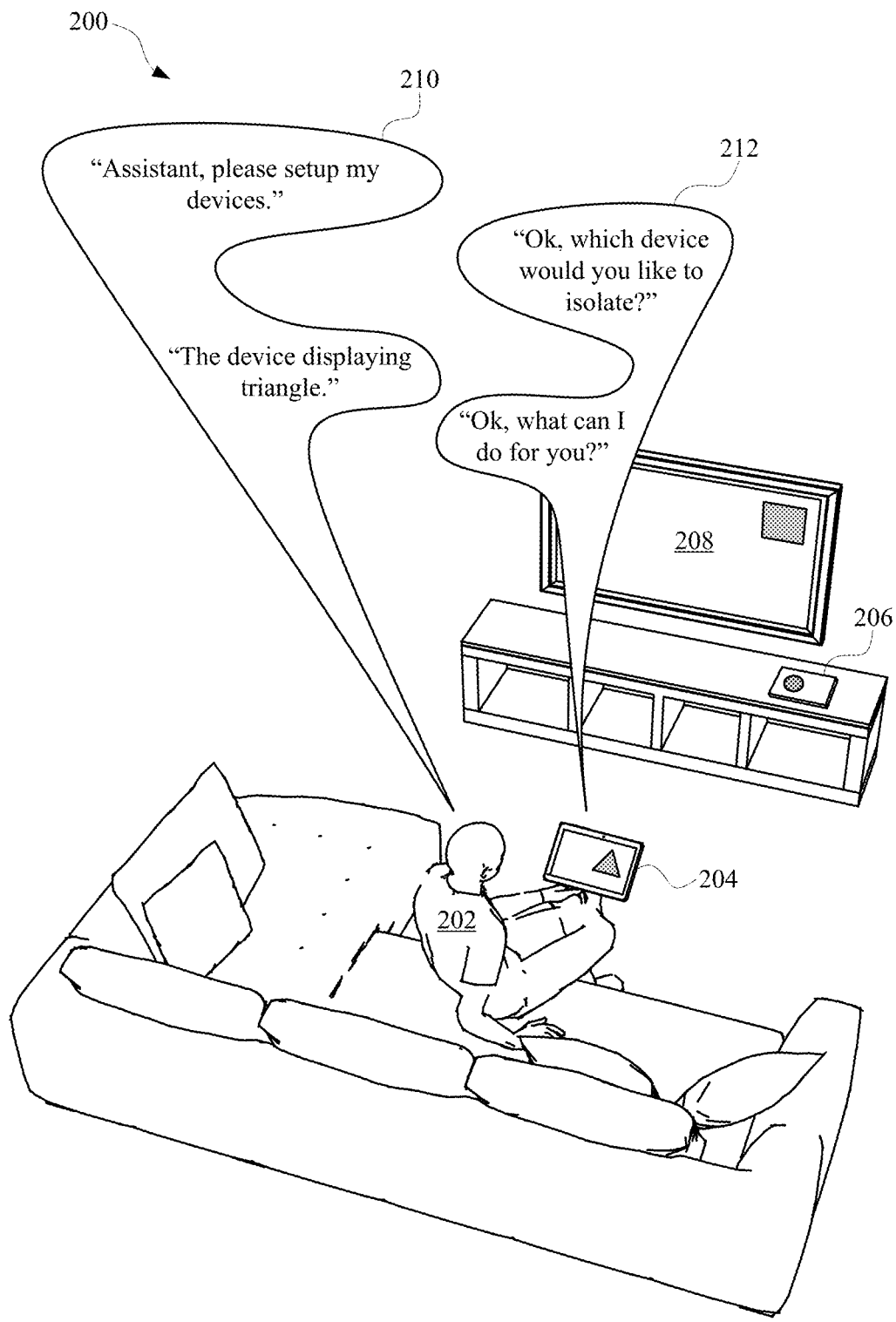
FIG. 2 illustrates a perspective view of a user interacting with an automated assistant in order to isolate a client device without necessarily communicating with a server device.

FIG. 2 illustrates a perspective view 200 of a user 202 interacting with an automated assistant in order to perform an isolation process to isolate a client device without necessarily communicating with a server device. The user 202 can possess multiple devices that are capable of connecting over a common network without necessarily being directly connected to each other. For example, the user 202 can own a tablet computing device 204, a television 208, and a cellular computing device 206. Each of these devices can be connected to a local network (e.g., a Wi-Fi network), which can allow them to interface with an automated assistant over the internet. However, the devices can also perform functions associated with the automated assistant without necessarily communicating over the internet. For example, the user 202 can provide spoken utterances to the devices to cause them to change their operating modes and/or access particular applications installed in the devices. Problems can occur when the user 202 issues a spoken utterance that causes the devices to be simultaneously responsive. This can cause the devices to waste power and computational resources by attempting to respond to a spoken utterance that may have been intended for a single device.

In order to isolate a single device from the multiple devices for receiving subsequent spoken utterances and dialog, the user 202 can provide a command 210 to one or more of the devices regarding setting up the devices. For example, the user 202 can provide a command 210 that includes the spoken utterance "Assistant, please setup my devices." The command 210 can be heard by each of the tablet computing device 204, the cellular computing device 206, and the television 208. However, each of the devices can be configured to not simultaneously respond, but rather listen, using an audio interface of each device, to determine whether one of the devices has responded. Specifically, each of the devices can generate a random value corresponding to delay period for responding to the command 210 from the user. For example, the tablet computing device 204 can generate a 2 second delay, the cellular computing device 206 can generate a 4 second delay, and the television 208 can generate a 6 second delay. During the delay period, each respective device will not provide a response to the command 210, thereby causing the device having the shortest delay period to provide the first response to the user 202. For instance, because the tablet computing device 204 generated the shortest value for the delay period (e.g., 2 seconds), the tablet computing device 204 will provide a response 212 before any other device.

In response to hearing that the tablet computing device 204 provided the response 212 (e.g., "Ok, which device would you like to isolate?"), each of the devices can present a unique identifier to the user 202 and listen for a subsequent command 210 from the user 202. For instance, each user interface of each device can generate a unique display graphic and/or audible sound to present to the user 202 in order that the user can identify a particular device to isolate. The display graphic can include a color, shape, image, video, and/or any other visual content that can be presented at a display device. The audible sound can include a device name, network name, personal identifier, random word, random phrase, device descriptor, and/or any other sound that can be used to identify a device.

As provided in FIG. 2, for example, each client device can present a unique graphical shape in order that the user 202 can identify a particular device from a displayed graphical shape. The tablet computing device 204 can display a triangle, the cellular computing device 206 can display a circle, and the television 208 can display a square. In some implementations, each device will not be put on notice of the identifiers being displayed by other devices, whereas in other implementations each device can be put on notice of the identifiers being displayed by other devices. For instance, when each device is not put on notice of the identifiers being presented by other devices, each device can listen for a response from the user 202 to determine whether it was identified. When selecting a device, the user 202 can provide a command 210 such as, "The device displaying a triangle." Each device can acknowledge the response and determine the identifier (e.g., "triangle") that was selected by the user 202. Each device can compare the user selected identifier to the identifier that is being displayed by the device in order to determine whether it was selected. For instance, the tablet computing device 204 can determine that a triangle was described by the user 202 and therefore remain in an operating mode that allows the tablet computing device 204 to respond to spoken utterances. Furthermore, the cellular computing device 206 and the television 208 can determine that they were not identified by the user 202, at least based on the user 202 not describing their respective identifiers in the command 210 within a response threshold period of time. As a result, each of the cellular computing device 206 and the television 208 can transition into an operating mode where they are temporarily unresponsive to spoken utterances and/or dialog from the user 202 for a period of time. In some implementations, during this period of time, the devices not identified by the user 202 can still provide notifications to the user 202 and/or respond to certain inputs from the user 202 (e.g., touch inputs, peripheral device inputs, remote server inputs, and/or any other input that can control an operation of a computing device).

Subsequent to the user 202 selecting the tablet computing device 204 to be isolated from the other devices for receiving spoken utterances and/or dialog, the cellular computing device 206 and the television 208 can listen for commands from the user 202. For example, the user 202 can decide to change the device that is isolated subsequent to the user 202 identifying the tablet computing device 204 as the device to be isolated. For instance, this can be performed in response to someone in the same home of the user 202 needing to use the tablet computing device 204 (e.g., a child needing to do homework with the tablet computing device 204). In order to identify a different device to be isolated, the user 202 can provide a command such as, "Assistant, designate the device that displayed the circle for receiving commands." In response, each of the devices can determine that the user 202 has referenced an identifier previously presented when the user 202 was setting up the devices to isolate the tablet computing device 204. Furthermore, each device can determine whether they were subsequently selected to be the isolated device. For instance, an automated assistant accessible to the cellular computing device 206 can determine that a circle was described by the user 202 and transition from a temporarily unresponsive mode to a responsive mode. Optionally, the device that was previously isolated (e.g., the tablet computing device 204) can transition from the responsive mode to a temporarily unresponsive mode, at least with respect to the voice of the user 202. In other words, the tablet computing device 204 can be temporarily unresponsive to certain commands from the user 202, and the cellular computing device 206 will be responsive to those certain commands.

Figure 3:
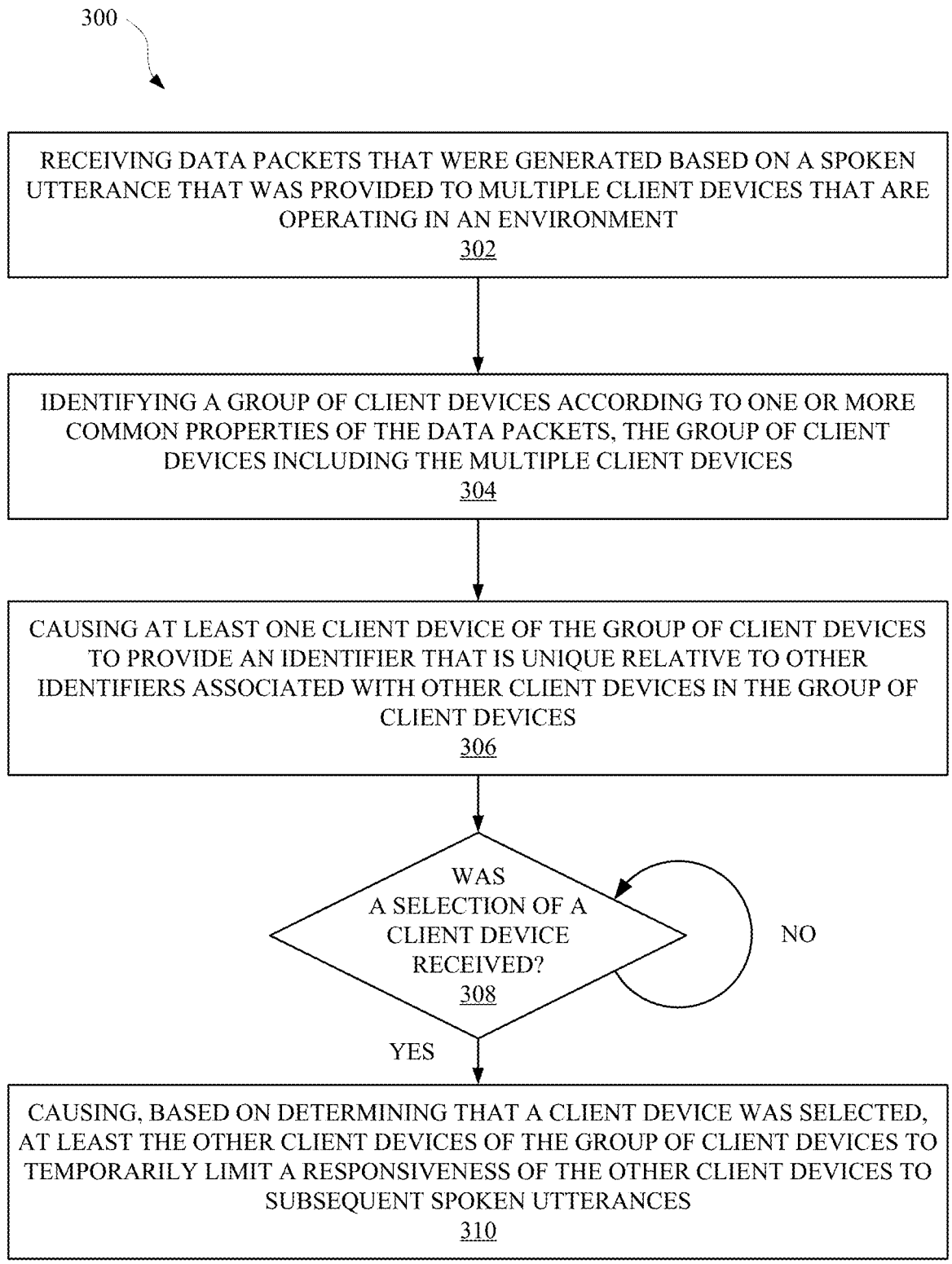
FIG. 3 illustrates a method for temporarily isolating a client device from other client devices for receiving commands and/or dialog.

FIG. 3 illustrates a method 300 for temporarily isolating a client device from other client devices for receiving commands and/or dialog. The method 300 can be performed by one or more server devices, computing devices, and/or any other apparatus capable of processing commands associated with a computing device. The method 300 can include an operation 302 of receiving data packets that were generated based on a spoken utterance that was provided to multiple client devices that are operating in an environment. The environment can refer to a context, a location, a time, and/or any other descriptor that can be used to define an environment of one or more persons. Furthermore, the data packets can include various types of data that can identify the environment, the spoken utterance, the client devices and/or properties of the multiple client devices, and/or any other types of data that can be associated with a command provided to a client device. For example, the data packets can include data that is based on audio received at the multiple client devices, in order that one or more server devices receiving the data can identify a spoken command (e.g., "Please setup my devices.") being provided to the multiple client devices. For instance, each data packet can include a segment of audio data captured at a corresponding client device.

The method 300 can also include an operation 304 of identifying a group or a subset of client devices according to one or more common properties of the data packets. At least one of the common properties can be a spoken utterance indicated by the data packets. The spoken utterance can be received by the multiple client devices substantially simultaneously in the environment (e.g., a car driving along the highway). Furthermore, at least one of the common properties can be associated with location data (e.g., a point along a route and/or a velocity of a device). In this way, the group of client devices can correspond to a group of devices that received the same command while in the same location, as indicated by the data packets. It should be noted that the location data (e.g., velocity, Wi-Fi SSID, GPS data, location services data, coordinates) can be generated at the client device and/or the server device. The location data can thereafter be compared with location data from various other client devices to identify a group of client devices in the same or similar location or context. In some implementations, the data packets can include audio data that can be processed according to a fast Fourier transform process or a machine learning classifier process. The resulting audio data (e.g., audio spectra data and/or audio classification data) can be generated at a client device(s) or the server device and be compared to data accessible to the server device in order to identify the user(s) that provided the spoken command A group of client devices can then be identified based on their receipt of a spoken utterance from the same user. In these and other manners, operation 304 enables analysis of a large quantity of data packets (e.g., hundreds or thousands) received over a time period (e.g., received from hundreds or thousands of client devices in disparate environments) to determine a group of the data packets that all relate to receipt of a single spoken utterance of a single user. The client devices that transmitted those data packets can then be identified as the subset of the client devices that are all in the same environment and that all received the single spoken utterance of the single user.

The method 300 can further include a block 306 of causing at least one client device of the group of client devices to provide an identifier that is unique relative to other identifiers associated with other client devices in the group of client devices. The identifier(s) can be generated by one or more server devices and provided to at least one client device in the group of client devices. Alternatively, the identifiers can be generated by the group of client devices, and a server device can cause at least one client device of the group of client devices to identify itself and/or other client devices in the group of client devices. For instance, if the user is driving along a highway in a vehicle that includes the group of client devices, one of the client devices can be caused to identify itself for the user to select to be isolated from the other client devices. Alternatively, one of the client devices can be caused to provide identifiers for all client devices in the group of client devices (i.e., all devices in the vehicle) for the user to select from. In another implementation, each of the client devices can be caused to provide an identifier that has been assigned to them such that the user will see and/or hear a series of identifiers from different client devices (e.g., "first device . . . second device . . . third device . . . ").

The method 300 can also include an operation 308 of determining whether a selection of a client device from the group of client devices was received. Specifically, the determination can be regarding whether the user provided some user interface input that identified one of the identifiers assigned to each client device of the group of client devices (e.g., spoken user interface input of "I'd like to continue using the first device."). If the user does not select a client device, the client devices and/or a server device can wait a reasonable amount of time before each of the client devices in the group of client devices return to their responsive operating modes. If the user has selected a client device, the method 300 can proceed to operation 310.

Operation 310 of method 300 can include causing, based on determining that a client device was selected from the group of client devices, the other client devices of the group of client devices to temporarily limit a responsiveness of at least the other client devices. For instance, temporarily limiting a responsiveness of a client device can include limiting the ability of the client device to respond to particular spoken commands, touch inputs, gestures, and/or any other inputs that can be used to control a computing device. The temporary limit can be applied for a period of time that is based on: a predetermined time period, contextual data provided by one or more client devices, application data available to a server device, instructions provided by the user, calendar data accessible to the client device, and/or any other data that can provide a basis for enforcing a temporary limit on a responsiveness of a client device. By limiting a client device in this way, computational resources and power can be preserved by not requiring multiple devices to simultaneously listen for and/or process inputs from a user. This can also preserve network bandwidth caused by multiple devices transmitting data to a network device in response to simultaneously receiving a command from a user.

Figure 4:
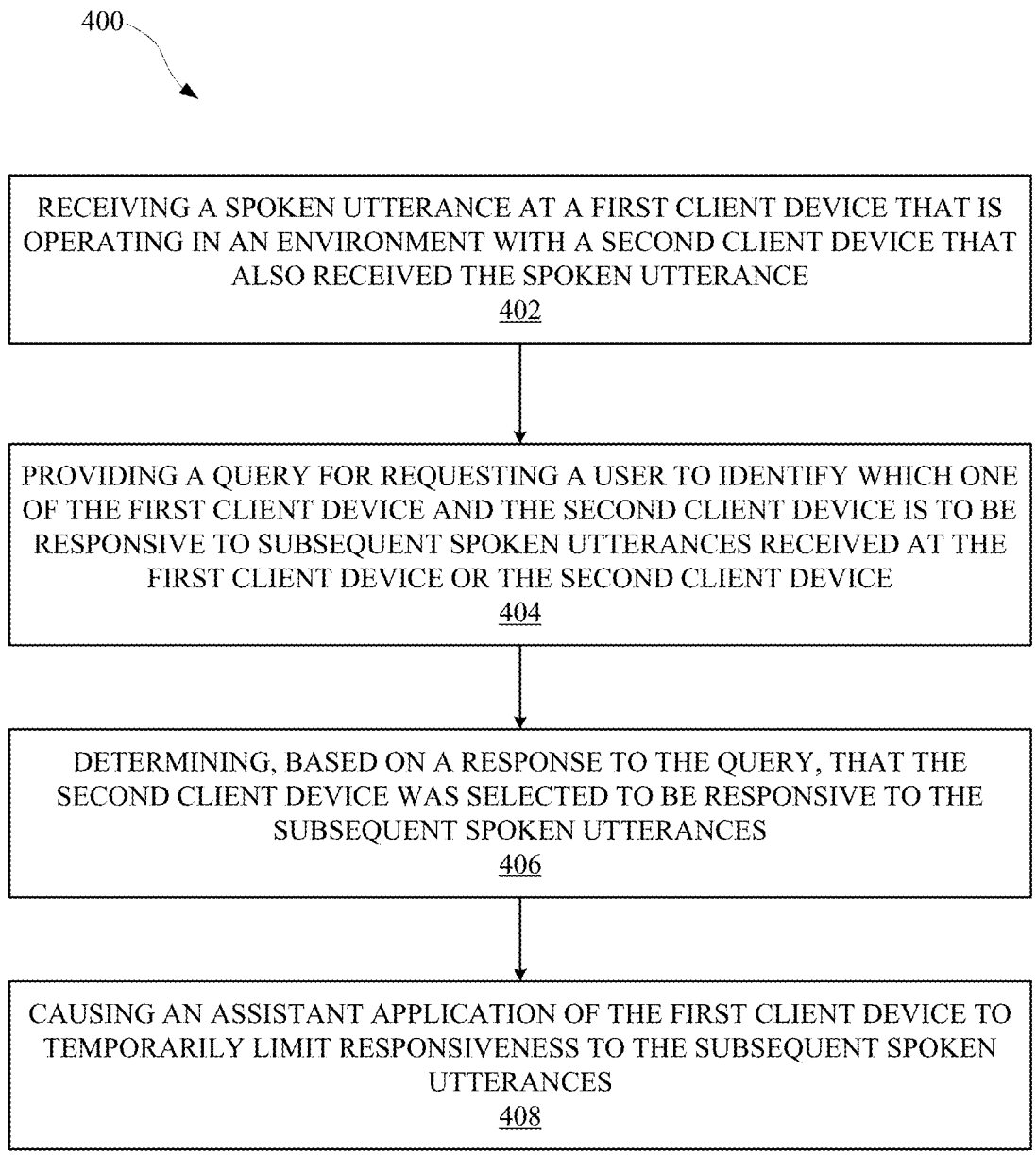
FIG. 4 illustrates a method for limiting a responsiveness of a client device to speakable voice commands, at least based on a command provided by a user to isolate a particular client device.

FIG. 4 illustrates a method 400 for limiting a responsiveness of a client device to speakable voice commands, at least based on a command provided by a user to isolate a particular client device. The method 400 can be performed by one or more server devices, one or more client devices, and/or any computing device capable of modifying response settings. The method 400 can include an operation 402 of receiving a spoken utterance at a first client device that is operating in an environment with a second client device that also received the spoken utterance. The environment can be a location, such as a house, that includes the first client device and the second client device. The first client device can be, for example, a tablet computing device and the second client device can be an assistant device. The spoken utterance can be a speakable command such as, but not limited to, "Assistant, please setup my devices." Because each of the client devices can include an audio interface (e.g., a microphone and a speaker), the client devices can receive the spoken utterance substantially simultaneously (e.g., within milliseconds of each other).

The method 400 can further include an operation 404 of providing a query for requesting a user to identify either one of the first client device or the second client device to be responsive to subsequent spoken utterances received at the first client device or the second client device. Optionally, the first client device can provide the query after waiting an amount of time for a delay period to expire. The query can be, for example, "Ok, identify the device that should remain responsive?" The delay period can correspond to a listening period when the first client device listens, using a microphone, to determine whether another client device has responded to the spoken utterance from the user. If no other device responds within the time allotted by the delay period, the first client device can provide the query to the user. However, if another client device does provide the query to the user, the first client device can acknowledge the response and wait for the user to provide a selecting to the query.

The method 400 can also include an operation 406 of determining, based on a response to the query, that the second client device was selected to be responsive to the subsequent spoken utterances. The response to the query can be received at the first client and/or the second client device. Furthermore, the response to the query can be, for example, "Please keep the assistant device responsive to commands" The first client device can compare the device identifier (e.g., "assistant device") provided in the response to one or more identifiers that the first client device is configured to respond to or otherwise associate itself with. If the response from the user identifies the first device as the device to response responsive, the first client device can remain in the same operating mode that the first client device was operating in before receiving the initial spoken utterance. However, as provided in operation 408 of method 400, if the first client device is not identified in the response, the first client device can temporarily limit a responsiveness of the first client device to subsequent spoken utterances and invocation phrases. By limiting the responsiveness of the first client device to particular spoken utterances, power and computational resources can be conserved. Furthermore, user interactions between the user and a client device can be uninterrupted by other devices that may be incidentally invoked by spoken commands.

Figure 5:
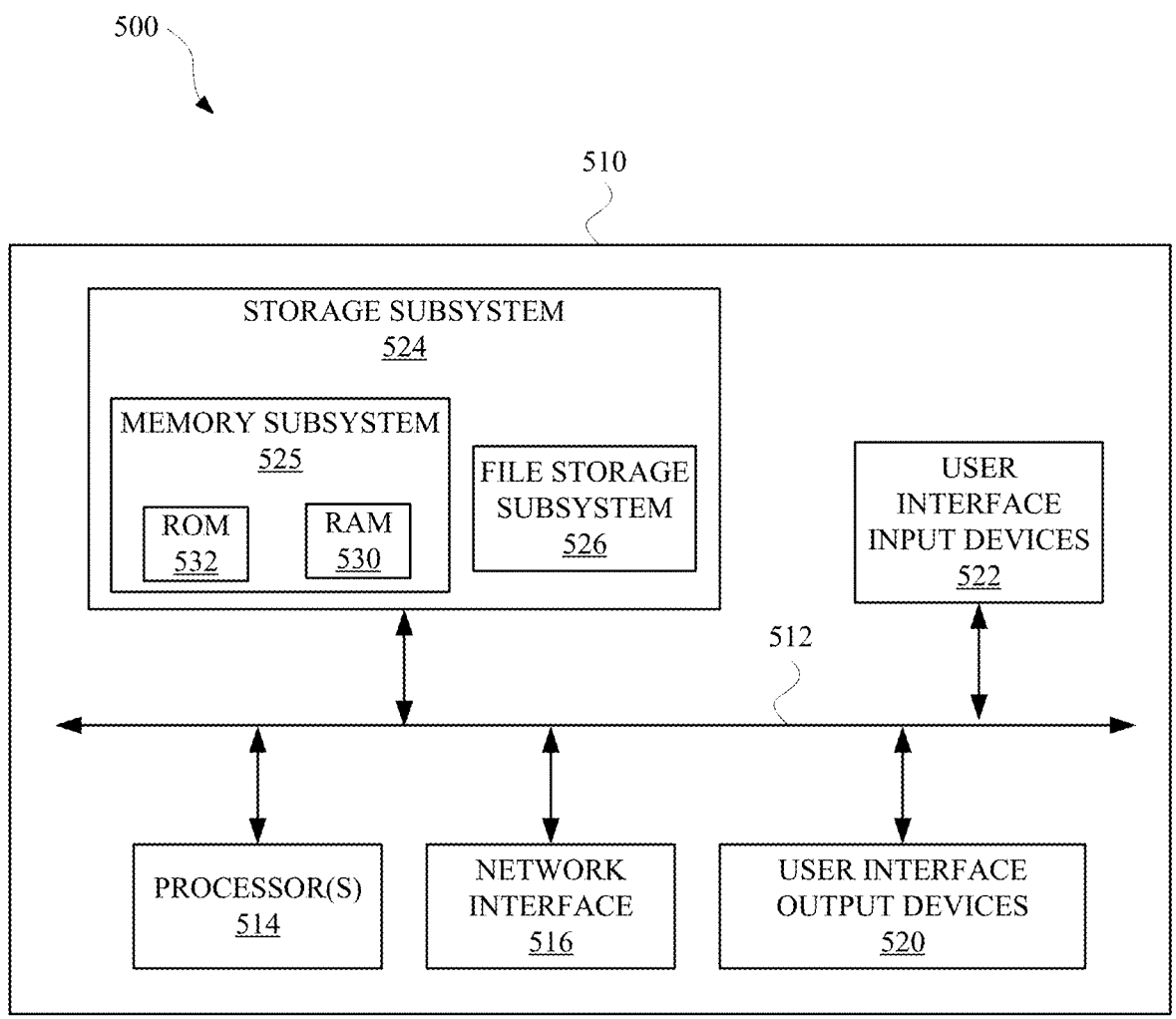
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of server device 102, automated assistant 104, cellular computing device 116, tablet computing device 134, vehicle computing device 128, tablet computing device 204, cellular computing device 206, television 208, and/or any other apparatus that perform any operations discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
receiving an instance of a spoken utterance at a client device that is operating in an environment with one or more additional client devices that also received the instance of the spoken utterance,
wherein each of the client device and the one or more additional client devices includes an assistant application that is responsive to the spoken utterance;
providing, by the client device and based on receiving the instance of the spoken utterance at the client device, user interface output that provides a prompt, to a user, related to whether the client device is to be responsive to invocations of the assistant application,
wherein each of the one or more additional client devices provides a respective prompt in response to receiving the instance of the spoken utterance, and
wherein the prompt provided at the client device is unique relative to each respective prompt provided at each of the one or more additional client devices;
determining, based on a response of the user to the prompt, that the client device is not to be responsive to invocations of the assistant application; and
in response to determining that the client device is not to be responsive to invocations of the assistant application:
causing the assistant application of the client device to temporarily limit responsiveness to one or more spoken invocations of the assistant application.

2. The method of claim 1, wherein causing the assistant application of the client device to temporarily limit responsiveness to the one or more spoken invocations of the assistant application comprises:
temporarily disabling, at the client device, monitoring for occurrence of the one or more spoken invocations directed to the assistant application of the client device.

3. The method of claim 1, further comprising:
determining a delay time; and
monitoring, by the client device during the delay time, for any response to the instance of the spoken utterance, from any one of the one or more additional client devices,
wherein providing the user interface output by the client device is performed after the delay time, and is in response to not detecting any response during the monitoring.

4. The method of claim 1, where determining that the client device is not to be responsive to invocations of the assistant application comprises:
determining that the response lacks any identifier of the client device.

5. The method of claim 1, wherein the instance of the spoken utterance is an explicit request to prevent responsiveness of one or more client devices to the invocations of the assistant application.

6. The method of claim 1, further comprising:
causing, based on receiving the instance of the spoken utterance at a separate client device, the separate client device to provide a unique identifier from which the user can identify the separate client device in the response.

7. The method of claim 1, wherein each of the one or more additional client devices provides the respective prompt concurrently with the user interface output of the client device.

8. A client device comprising:
one or more microphones;
at least one user interface output device;
memory storing instructions;
one or more processors executing the instructions to:
receive, via the one or more microphones, an instance of a spoken utterance,
wherein the client device is in an environment with one or more additional client devices that also received the instance of the spoken utterance,
wherein each of the client device and the one or more additional client devices includes an assistant application that is responsive to the spoken utterance;
render, via the user interface output device and based on receiving the instance of the spoken utterance at the client device, user interface output that provides a prompt, to a user, related to whether the client device is to be responsive to invocations of the assistant application,
wherein each of the one or more additional client devices renders a respective prompt in response to receiving the instance of the spoken utterance, and
wherein the prompt rendered at the client device is unique relative to each respective prompt rendered at each of the one or more additional client devices;
determine, based on a response of the user to the prompt, that the client device is not to be responsive to invocations of the assistant application; and
in response to determining that the client device is not to be responsive to invocations of the assistant application:
cause the assistant application of the client device to temporarily limit responsiveness to one or more spoken invocations of the assistant application.

9. The client device of claim 8, wherein in causing the assistant application of the client device to temporarily limit responsiveness to the one or more spoken invocations of the assistant application one or more of the processors are to:
temporarily disable, at the client device, monitoring for occurrence of the one or more spoken invocations directed to the assistant application of the client device.

10. The client device of claim 8, wherein one or more of the processors are further to:
determine a delay time; and
monitor, during the delay time, for any response to the instance of the spoken utterance, from any one of the one or more additional client devices,
wherein rendering the user interface output by the client device is performed after the delay time, and is in response to not detecting any response during the monitoring.

11. The client device of claim 8, where in determining that the client device is not to be responsive to invocations of the assistant application one or more of the processors are to:

determine that the response lacks any identifier of the client device.

12. The client device of claim 8, wherein the instance of the spoken utterance is an explicit request to prevent responsiveness of one or more client devices to the invocations of the assistant application.

13. The client device of claim 8, wherein one or more of the processors are further to:
cause the separate client device to render a unique identifier from which the user can identify the separate client device in the response.

14. The client device of claim 8, wherein each of the one or more additional client devices provides the respective prompt concurrently with the user interface output of the client device.

15. At least one non-transitory computer readable medium storing instructions that, when executed by a client device causes the client device to perform a method comprising:
receiving an instance of a spoken utterance at the client device, wherein the client device is operating in an environment with one or more additional client devices that also received the instance of the spoken utterance, wherein each of the client device and the one or more additional client devices includes an assistant application that is responsive to the spoken utterance;

providing, by the client device and based on receiving the instance of the spoken utterance at the client device, user interface output that provides a prompt, to a user, related to whether the client device is to be responsive to invocations of the assistant application,
wherein each of the one or more additional client devices provides a respective prompt in response to receiving the instance of the spoken utterance, and
wherein the prompt provided at the client device is unique relative to each respective prompt provided at each of the one or more additional client devices;

determining, based on a response of the user to the prompt, that the client device is not to be responsive to invocations of the assistant application; and in response to determining that the client device is not to be responsive to invocations of the assistant application:

causing the assistant application of the client device to temporarily limit responsiveness to one or more spoken invocations of the assistant application.

\* \* \* \* \*